US009976442B2

(12) United States Patent
Yeager et al.

(10) Patent No.: US 9,976,442 B2
(45) Date of Patent: May 22, 2018

(54) HEAT SHIELD BASED AIR DAM FOR A TURBINE EXHAUST CASE

(71) Applicant: United Technologies Corporation, Hartford, CT (US)

(72) Inventors: William Yeager, Jupiter, FL (US); Conway Chuong, Manchester, CT (US); Matthew Budnick, Hudson, NH (US)

(73) Assignee: United Technologies Corporation, Farmington, CT (US)

( * ) Notice: Subject to any disclaimer, the term of this patent is extended or adjusted under 35 U.S.C. 154(b) by 399 days.

(21) Appl. No.: 14/441,521

(22) PCT Filed: Dec. 18, 2013

(86) PCT No.: PCT/US2013/076169
§ 371 (c)(1),
(2) Date: May 8, 2015

(87) PCT Pub. No.: WO2014/105573
PCT Pub. Date: Jul. 3, 2014

(65) Prior Publication Data
US 2015/0292356 A1 Oct. 15, 2015

Related U.S. Application Data

(60) Provisional application No. 61/747,234, filed on Dec. 29, 2012.

(51) Int. Cl.
*F01D 9/00* (2006.01)
*F01D 25/14* (2006.01)
(Continued)

(52) U.S. Cl.
CPC ............. *F01D 25/14* (2013.01); *F01D 9/041* (2013.01); *F01D 9/065* (2013.01); *F01D 25/162* (2013.01);
(Continued)

(58) Field of Classification Search
CPC ...................................................... F01D 25/162
See application file for complete search history.

(56) References Cited

U.S. PATENT DOCUMENTS 2,869,941 A * 1/1959 Shoup, Jr. ............. F01D 25/164
384/581
2,961,150 A 11/1960 Pirtle
(Continued)

FOREIGN PATENT DOCUMENTS

| EP | 0550126 A1 | 7/1993 |
| GB | 2226086 A | 6/1990 |
| GB | 2461367 A | 1/2010 |

OTHER PUBLICATIONS

The European Search Report dated Dec. 2, 2015 for European Application No. 13866906.4.

*Primary Examiner* — Woody Lee, Jr.
(74) *Attorney, Agent, or Firm* — Kinney & Lange, P.A.

(57) ABSTRACT

A turbine exhaust case employed in an industrial gas turbine engine includes a frame, a fairing and a heat shield. The frame includes an outer ring, an inner ring, and struts connected between the outer ring and the inner ring. The fairing includes a fairing outer ring, a fairing inner ring, and fairing struts connected between the fairing outer ring and the fairing inner ring. The heat shield is located between the frame outer ring and the fairing outer ring and provides a thermal barrier between the fairing outer ring and the frame outer ring, wherein the heat shield includes an aft portion having a flange that interfaces with the frame outer ring to form an air dam that directs cooling airflow forward along the frame outer ring within an outer diameter cavity formed between the frame outer ring and the heat shield.

17 Claims, 7 Drawing Sheets

(51) Int. Cl.
  *F01D 25/30* (2006.01)
  *F01D 25/16* (2006.01)
  *F02C 7/18* (2006.01)
  *F01D 9/04* (2006.01)
  *F01D 9/06* (2006.01)

(52) U.S. Cl.
  CPC ............... *F01D 25/30* (2013.01); *F02C 7/18* (2013.01); *F05D 2240/15* (2013.01); *Y02T 50/675* (2013.01)

(56) References Cited

U.S. PATENT DOCUMENTS

| | | | |
|---|---|---|---|
| 4,321,007 A | 3/1982 | Dennison et al. | |
| 5,188,507 A * | 2/1993 | Sweeney | B23H 9/10 415/170.1 |
| 5,273,397 A | 12/1993 | Czachor et al. | |
| 5,609,467 A | 3/1997 | Lenhart et al. | |
| 7,055,305 B2 | 6/2006 | Baxter et al. | |
| 8,083,465 B2 * | 12/2011 | Herbst | B23P 6/005 29/402.11 |
| 8,944,749 B2 * | 2/2015 | Durocher | F01D 9/065 184/6.11 |
| 9,297,312 B2 * | 3/2016 | Chuong | F02C 7/20 |
| 9,562,478 B2 * | 2/2017 | Chuong | F02C 7/28 |
| 2003/0161716 A1 | 8/2003 | Nguyen et al. | |
| 2005/0050898 A1 | 3/2005 | Noda | |
| 2010/0061846 A1 | 3/2010 | Herbst et al. | |
| 2010/0275572 A1 * | 11/2010 | Durocher | F01D 9/065 60/39.08 |
| 2011/0079019 A1 * | 4/2011 | Durocher | F01D 5/082 60/796 |
| 2011/0081237 A1 * | 4/2011 | Durocher | F01D 9/06 415/173.1 |
| 2015/0345338 A1 * | 12/2015 | Yeager | F01D 25/162 415/177 |

* cited by examiner

HEAT SHIELD BASED AIR DAM FOR A TURBINE EXHAUST CASE

BACKGROUND

The present invention is directed to turbine exhaust cases (TECs) utilized in gas turbine engines, and in particular to a heat shield utilized in the TEC.

Turbine Exhaust Cases (TECs) typically comprise structural frames that support the very aft end of a gas turbine engine. In aircraft applications, the TEC can be utilized to mount the engine to the aircraft airframe. In industrial gas turbine applications, the TEC can be utilized to couple the gas turbine engine to an electrical generator. A typical TEC comprises an outer ring that couples to the outer diameter case of the low pressure turbine, an in inner ring that surrounds the engine centerline so as to support shafting in the engine, and a plurality of struts connecting the inner and outer rings.

The components of the TEC are exposed to very high temperatures associated with the gas path. Various approaches and architectures are employed to handle the high temperatures. For example, components of the TEC may utilize materials capable of handling the high temperature associated with the gas path, may utilize various shielding materials (e.g., heat shields, fairings) to surround and protect structural components from the high temperatures associated with the gas path, and/or may use cooling airflow to regulate the temperature of the various TEC components.

SUMMARY

A turbine exhaust case employed in an industrial gas turbine engine includes a frame, a fairing and a heat shield. The frame includes an outer ring, an inner ring, and frame struts connected between the outer ring and the inner ring. The fairing includes a fairing outer ring, a fairing inner ring, and fairing struts connected between the fairing outer ring and the fairing inner ring. The heat shield is located between the frame outer ring and the fairing outer ring and provides a thermal barrier between the fairing outer ring and the frame outer ring. The heat shield includes an aft portion having a flange that interfaces with the frame outer ring to form an air dam that directs cooling airflow forward along the frame outer ring within an outer diameter cavity formed between the frame outer ring and the heat shield.

DETAILED DESCRIPTION

Figure 1:
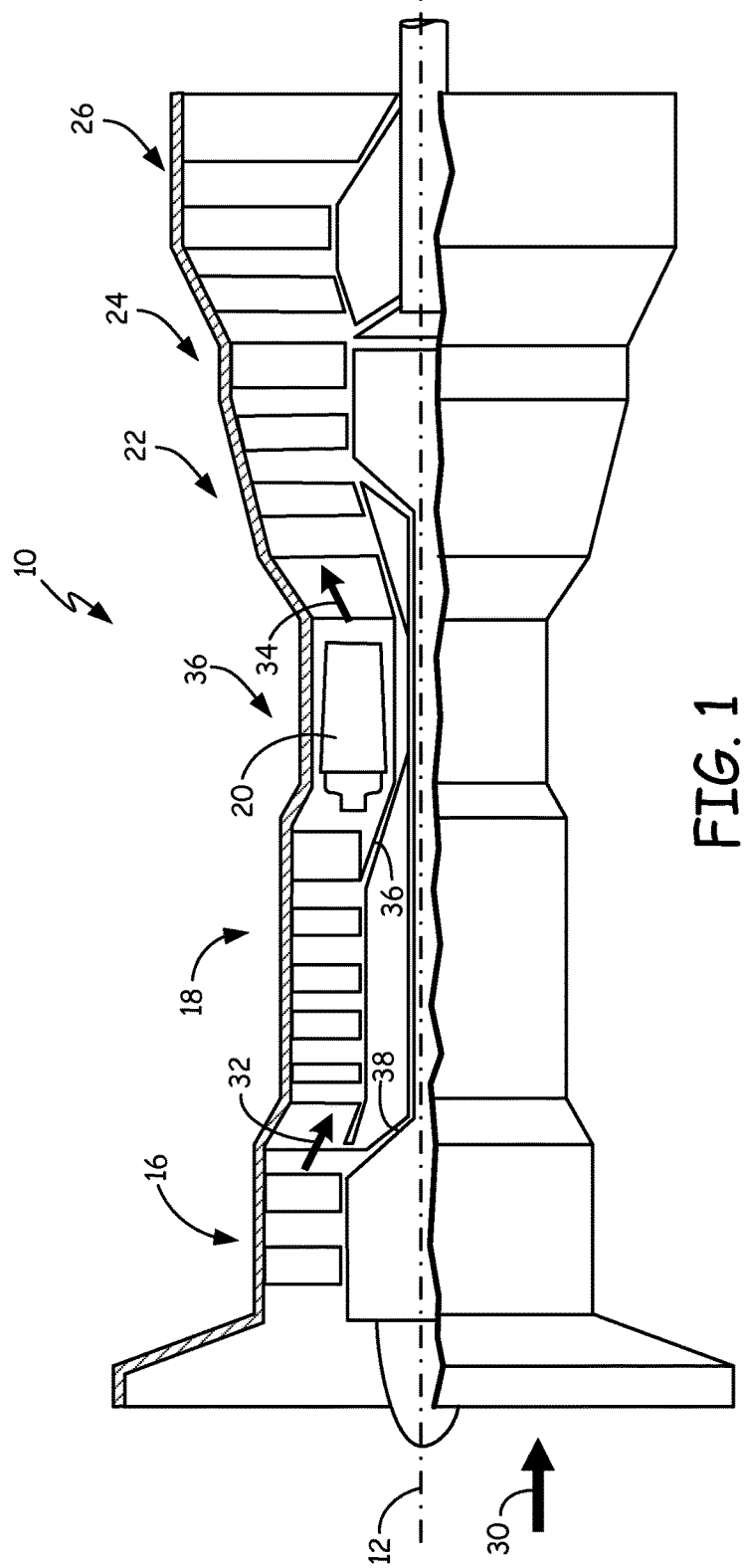
FIG. 1 is a side sectional schematic view of an industrial gas turbine engine having a turbine exhaust case.

FIG. 1 is a side partial sectional schematic view of gas turbine engine 10. In the illustrated embodiment, gas turbine engine 10 is an industrial gas turbine engine circumferentially disposed about a central, longitudinal axis or axial engine centerline axis 12 as illustrated in FIG. 1. Gas turbine engine 10 includes, in series order from front to rear, low pressure compressor section 16, high pressure compressor section 18, combustor section 20, high pressure turbine section 22, and low pressure turbine section 24. In some embodiments, power turbine section 26 is a free turbine section disposed aft of the low pressure turbine 24.

As is well known in the art of gas turbines, incoming ambient air 30 becomes pressurized air 32 in the low and high pressure compressor sections 16 and 18. Fuel mixes with pressurized air 32 in combustor section 20, where it is burned. Once burned, combustion gases 34 expand through high and low pressure turbine sections 22 and 24 and through power turbine section 26. High and low pressure turbine sections 22 and 24 drive high and low pressure rotor shafts 36 and 38 respectively, which rotate in response to flow of combustion gases 34 and thus rotate the attached high and low pressure compressor sections 18 and 16. Power turbine section 26 may, for example, drive an electrical generator, pump, or gearbox (not shown).

Low Pressure Turbine Exhaust Case (LPTEC) 40 is positioned between low pressure turbine section 24 and power turbine section 26. LPTEC 40 defines a flow path for gas exhausted from low pressure turbine section 24 that is conveyed to power turbine 26. LPTEC 40 also provides structural support for gas turbine engine 10 so as to provide a coupling point for power turbine section 26. LPTEC 40 is therefore rigid and structurally strong. The present invention relates generally to controlling and directing cooling airflow within LPTEC 40.

It is understood that FIG. 1 provides a basic understanding and overview of the various sections and the basic operation of an industrial gas turbine engine. It will become apparent to those skilled in the art that the present application is applicable to all types of gas turbine engines, including those with aerospace applications. Similarly, although the present disclosure is described with reference to cooling arrangements employed in LPTEC 40, the present invention is applicable to other components of gas turbine engines, such as intermediate cases, mid-turbine frames and the like.

Figure 2A:
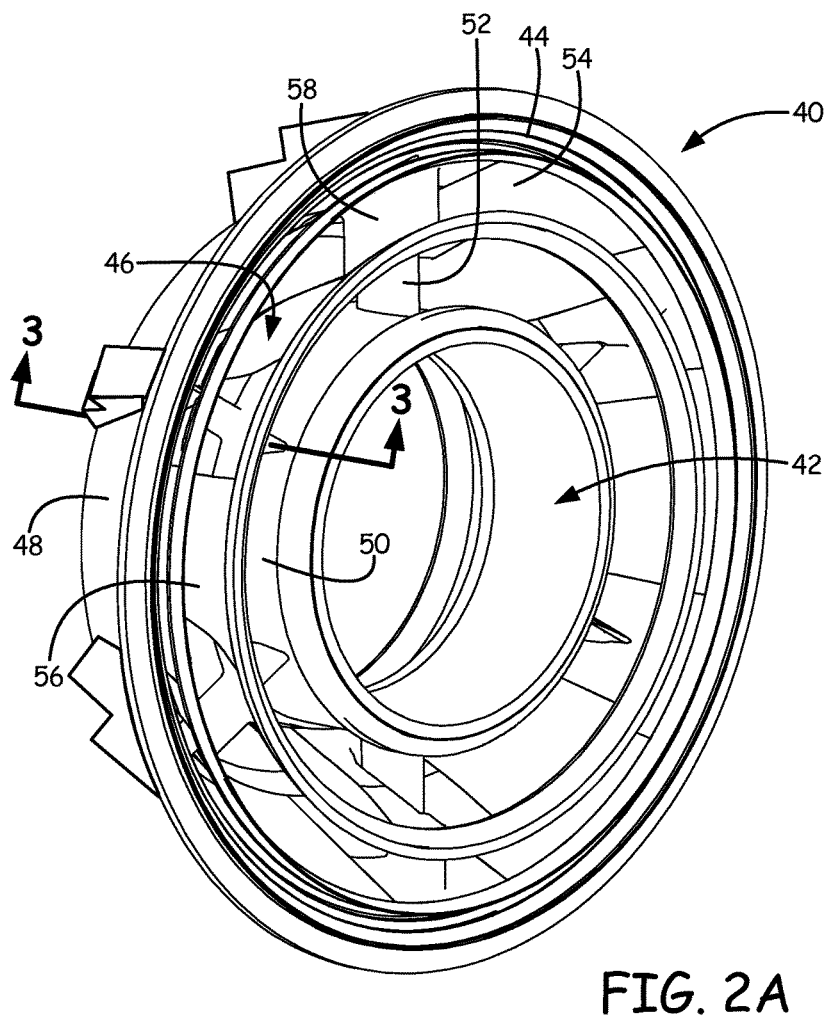
FIG. 2A is a perspective view of a turbine exhaust case in which a ring-strut-ring fairing is assembled with a ring-strut-ring frame.
Figure 2B:
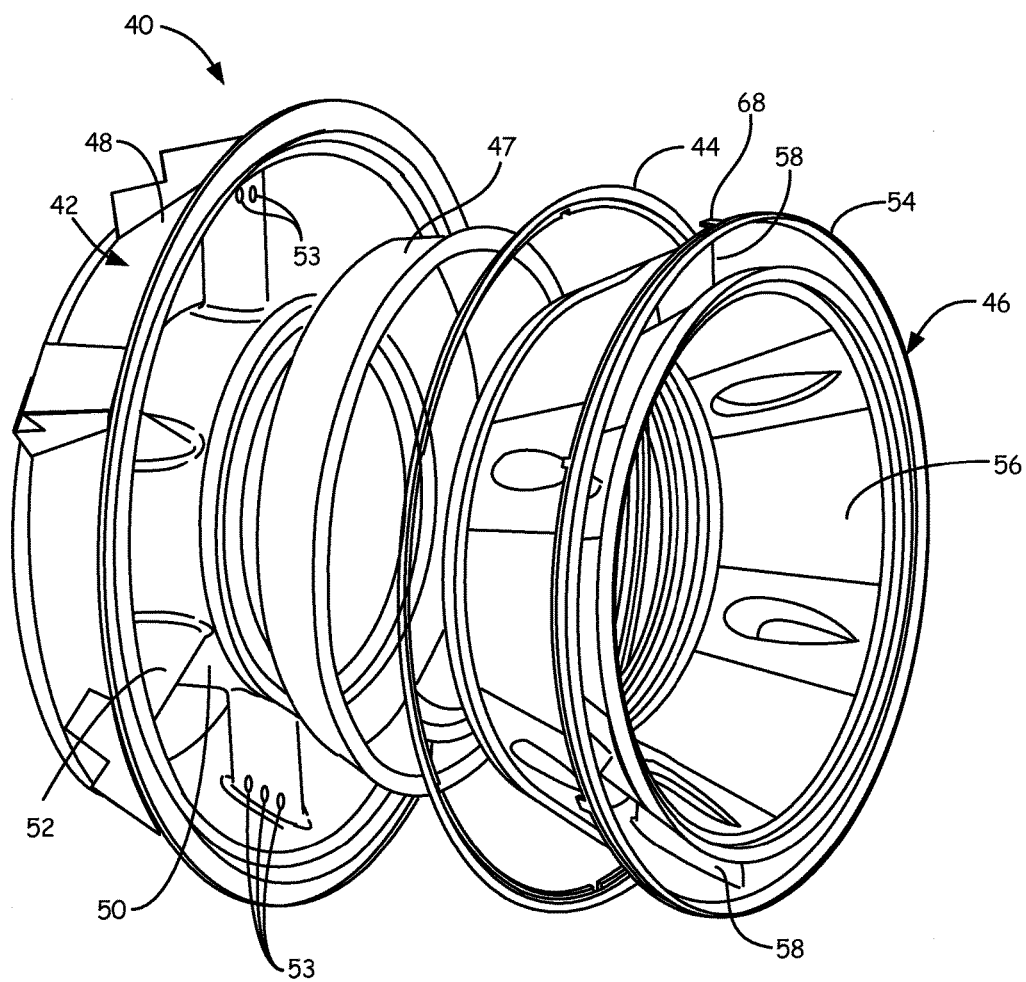
FIG. 2B is an exploded view of the turbine exhaust case of FIG. 2A showing the frame, the fairing and a circumferential stop ring.

FIG. 2A shows a perspective view of Low Pressure Turbine Exhaust Case (LPTEC) 40, which includes frame 42, annular mount 44, and fairing 46. FIG. 2B, which is discussed concurrently with FIG. 2A, shows an exploded view of LPTEC 40 that illustrates heat shield 47 disposed between a portion of fairing 46 and a portion of frame 42. Frame 42 includes frame outer ring 48, frame inner ring 50, and frame struts 52. Fairing 46 includes fairing outer ring 54, fairing inner ring 56, and fairing struts 58. In general, heat shield portions are utilized between frame 42 and fairing 46 to provide thermal protection to frame 42, which must be maintained at an operating temperature less than that of fairing 46. Heat shield 47 is disposed between frame outer ring 48 and fairing outer ring 54.

Frame 42 comprises a ring-strut-ring structure that connects outer ring 48 and inner ring 50 via struts 52. Fairing 46 also comprises a ring-strut-ring structure that is mounted within frame 42 to protect frame 42 from high temperature exposure and to define a gas path. In one embodiment, fairing 46 can be built around frame 42, and in another embodiment, frame 42 is built within fairing 46.

Frame 42 comprises a stator component of gas turbine engine 10 (FIG. 1) that is typically mounted between low pressure compressor section 24 and power turbine section 26. In the embodiment shown, outer ring 48 of frame 42 is conically shaped, while inner ring 50 is cylindrically shaped. Outer ring 48 is connected to inner ring 50 via struts 52. Outer ring 48, inner ring 50 and struts 52 form a portion of the gas flow path through gas turbine engine 10 (FIG. 1). Specifically, outer ring 48 and inner ring 50 define the outer and inner radial boundaries of an annular flow path between low pressure turbine section 24 and power turbine section 26 (FIG. 1), while struts 52 intermittently interrupt the annular flow path. In the embodiment shown in FIG. 2B, struts 52 include a plurality of holes or apertures 53 that allow airflow provided through the hollow portion of struts 52 to be communicated into an outer diameter (OD) cavity defined between outer ring 48 and fairing outer ring 54.

Fairing 46 is adapted to be disposed within frame 42 between outer ring 48 and inner ring 50. Fairing outer ring 54 and fairing inner ring 56 of fairing 46 have generally conical shapes, and are connected to each other by fairing struts 58. Fairing outer ring 54, fairing inner ring 56, and fairing struts 58, form a liner for the portion of the gas flow path through frame 42. Specifically, fairing struts 58 encase struts 52, while fairing outer ring 54 and fairing inner ring 56 line gas path facing surfaces of outer ring 48 and inner ring 50, respectively. Fairing struts 58 are hollow, with openings 59 that open into the OD cavity between outer ring 48 and fairing outer ring 54 and into an inner diameter (ID) chamber between inner ring 50 and fairing inner ring 56.

Heat shield 47 is disposed between frame outer ring 48 and fairing outer ring 54 to provide thermal protection to frame outer ring 48. Heat shield 47 is generally conical in shape. However, the aft portion of heat shield 47 includes a flange (shown in more detail in FIGS. 3A, 3B and 4) that acts as an air dam to prevent cooling air flow from escaping from the OD cavity in an aftward direction. As a result, cooling air flow is directed forward and flows circumferentially around frame outer ring 48. In addition, as discussed in more detail below, heat shield 47 encourages circumferential flow of cooling airflow by preventing the cooling airflow from flowing aftward.

Figure 3A:
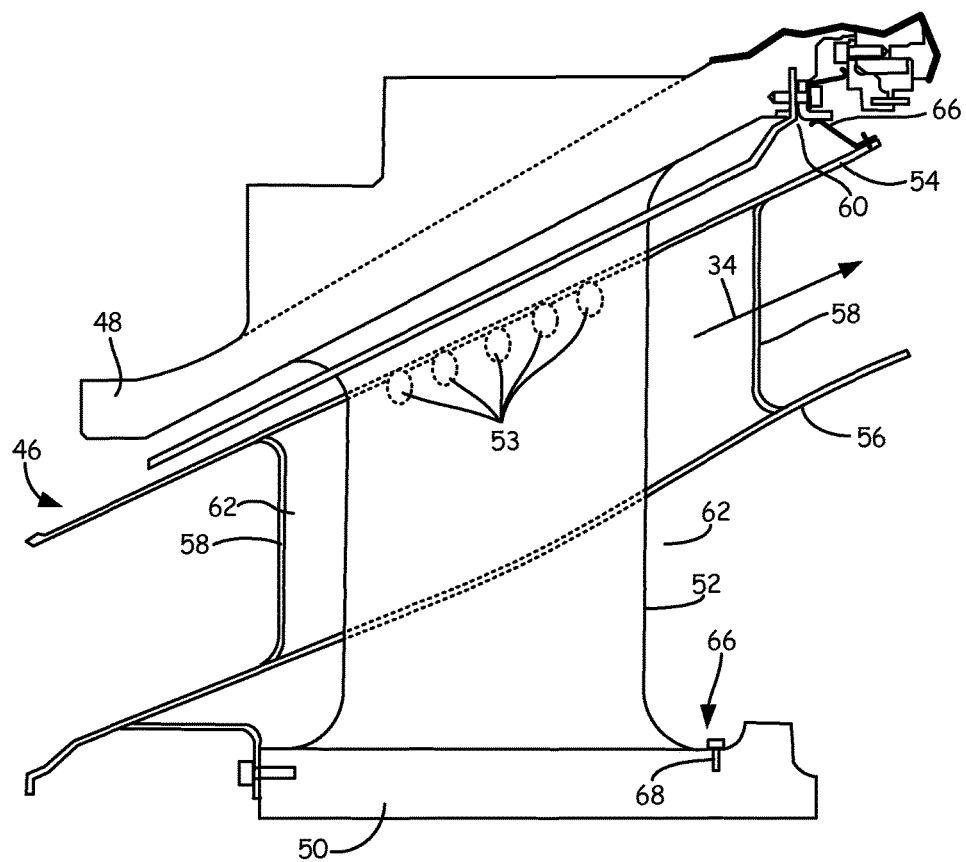
FIG. 3A is a cross-sectional view of the turbine exhaust case taken along line 3-3 shown in FIG. 2A.
Figure 3B:
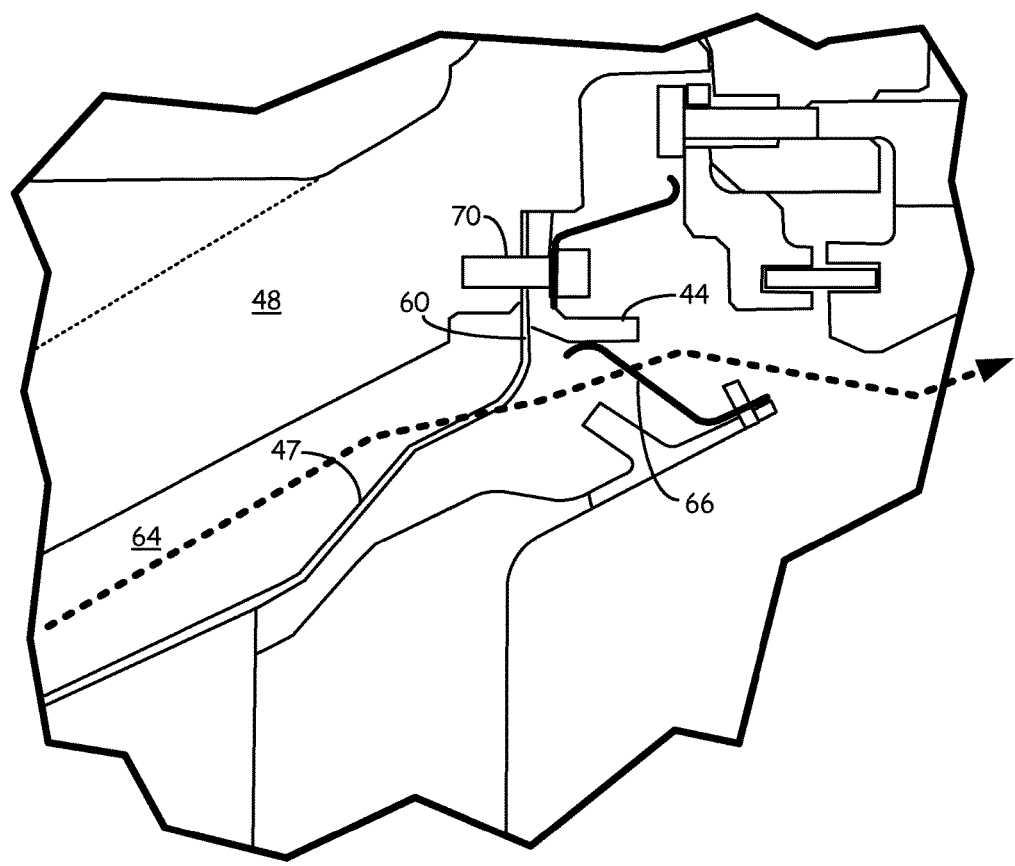
FIG. 3B is an enlarged view of a portion of FIG. 3A that illustrates connection of the heat shield to the frame to form the air dam according to an embodiment of the present invention.

FIGS. 3A and 3B are cross-sectional views of turbine exhaust case 40 taken along line 3-3 shown in FIG. 2A that illustrates the disposition of heat shield 47 within TEC 40. FIG. 3B illustrates in additional detail flange 60 located on the aft end of heat shield 47 and the connection of flange 60 to frame outer ring 48 to form the desired air dam geometry.

As described with respect to FIGS. 2A and 2B, frame 42 includes outer ring 48, inner ring 50, and a plurality of struts 52 connecting outer ring 48 to inner ring 50. Fairing 46 includes fairing outer ring 54, fairing inner ring 56 and fairing strut 58. The components making up fairing 46 define the gas path through which hot gas from the combustor flows, and provide thermal insulation for outer ring 48, inner ring 50 and struts 52, which are disposed within hollow fairing struts 58. Heat shield 47 is disposed between frame outer ring 48 and fairing outer ring 54 to provide thermal insulation/protection of frame outer ring 48. The aft portion of heat shield 47 includes flange 60 that is directed approximately perpendicular to centerline axis 12 (shown in FIG. 1), wherein flange 60 is provides a surface for mounting heat shield 47 to frame outer ring 48.

Cooling airflow C is provided from inner diameter (ID) cavity 62, located radially interior to frame inner ring 50, to outer diameter (OD) cavity 64 via hollow frame struts 52. In the embodiment shown in FIGS. 3A and 3B, the cooling airflow is supplied via the hollow portion of frame struts 52, and is communicated to OD cavity 64 via a plurality of metering holes 53. In other embodiments, the cooling airflow may be supplied from a source other than via the hollow portion of frame struts 52. It is advantageous for cooling airflow provided to OD cavity 64 to circulate both forward and aft to provide cooling to frame outer ring 48. The air dam created by the connection of flange 60 to frame outer ring 48 prevents most of the cooling airflow from leaking into the gas path via holes or under the heat shield, and instead re-directs at least a portion of the cooling airflow forward to provide additional cooling of frame outer ring 48. The amount of cooling airflow allowed to leak aftward toward finger seal 66 is metered by one or more metering holes (shown in FIG. 4) disposed around an aft portion of heat shield 47.

FIG. 3B is an enlarged view of a portion of FIG. 3A that illustrates in additional detail the connection of flange 60 to frame outer ring 48. As shown in FIG. 3B, flange 60 of heat shield 47 is disposed between annular mount 44 and frame outer ring 48, and is secured to frame outer ring 48 by bolt 70. In this way, the geometry of heat shield 47 and connection of flange 60 to frame outer ring 48 creates an air dam that re-directs cooling airflow within OD cavity 64 forward. In embodiments in which it is desirable for a certain amount of cooling airflow to be provided aftward via finger seal 66, heat shield 47 may include one or more metering holes for metering the flow of cooling airflow aftward towards finger seal 66.

Figure 4:
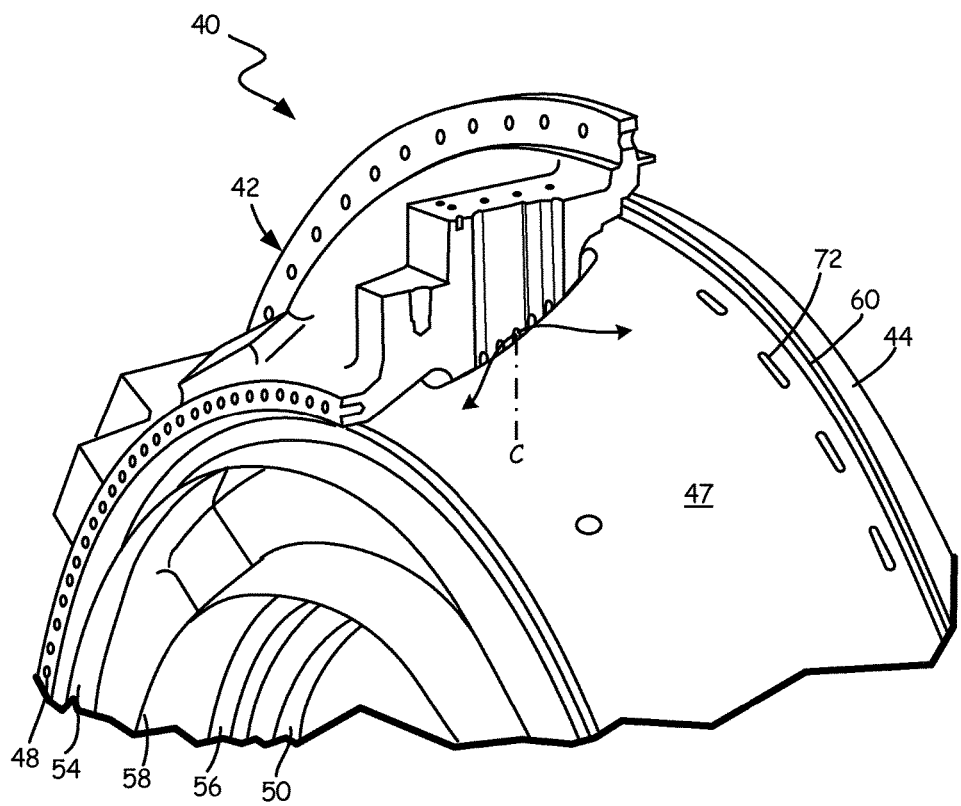
FIG. 4 is a perspective view in which the frame outer ring is cut to illustrate the geometry of the heat shield according to an embodiment of the present invention.

FIG. 4 is a perspective view of TEC 40 with a portion of frame outer ring 48 cut away to illustrate the geometry of heat shield 47. As described previously, frame 42 includes frame outer ring 48, frame struts 50 and frame inner ring 50. Fairing 46 includes fairing outer ring 54, fairing inner ring 56 and fairing struts 58. Frame outer ring 48 is disposed radially outward of all other components, and is connected to frame inner ring 50 by frame struts 52. Fairing outer ring 54 is disposed radially inward of frame outer ring, and is connected to fairing inner ring 56 by fairing struts 58. Fairing outer ring 54, fairing inner ring 56 and fairing struts 58 define the gas path, and are disposed between components of the frame and the gas path to provide thermal protection to frame 42.

Heat shield 47 is disposed circumferentially between frame outer ring 48 and fairing outer ring 54. Flange 60 is located on the aft portion of heat shield 47 and is directed substantially perpendicular to centerline axis 12. Heat shield 47 further includes a plurality of metering holes 72 disposed circumferentially around heat shield 47 to meter the flow of cooling airflow out of OD cavity 64 (located between frame outer ring 48 and fairing outer ring 54). The amount of cooling airflow expelled from OD cavity 64 depends on the number, size and placement of the plurality of metering holes 72. In one embodiment, the plurality of metering holes 72 are equally sized and spaced circumferentially around heat shield 47. In another embodiment, the plurality of metering holes 72 vary in size depending on the desired airflow characteristics and may similarly vary in spacing around heat shield 47.

As described with respect to FIG. 3A, cooling airflow C is provided circumferentially outward when expelled from metering holes 53. The cooling airflow C is circulated between frame outer ring 48 and heat shield 47. Cooling airflow that comes into contact with an aft end of heat shield 47 is redirected in a forward direction by flange 60. The circulation of cooling airflow C provides cooling to frame outer ring 48. Metering holes 72 allow a portion of cooling airflow to be directed from OD cavity 64 aftward toward finger seal 66 (shown in FIG. 3A) and eventually into the gaspath.

Figure 5:
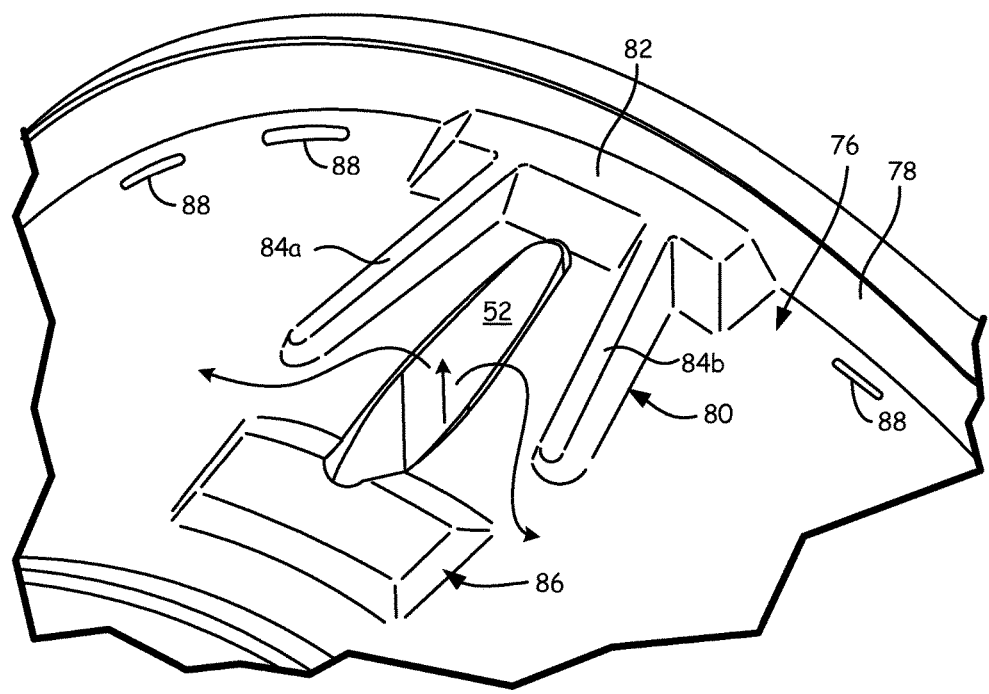
FIG. 5 is a perspective view of the heat shield illustrating flow geometry features according to another embodiment of the present invention.

FIG. 5 is a perspective view of heat shield 76 according to another embodiment of the present invention. In the embodiment shown in FIG. 5, heat shield 76 includes flange 78, air dam 80, which includes air dam portions 82, 84a and 84b, air dam 86, and metering holes 88. Flange 78 is located at an aft end of heat shield 76 for coupling with a frame outer ring (not shown), wherein the geometry of flange 78 creates an air dam that directs cooling airflow forward. Metering holes 88 are located circumferentially around heat shield 76 and act to meter the cooling airflow that flows out of the OD cavity.

Air dam 80 and air dam 86 each have elevated geometries (relative to the relatively conical surface of heat shield 76) that act to further direct the flow of cooling airflow discharged from strut 52 into the OD cavity. In particular, air dam 80 is disposed around the gap through which strut 52 provides cooling airflow into the OD cavity. Air dam portion 82 is disposed aftward of strut 52. Air dam portions 84a and 84b, which are integral with or connected to air dam portion 82, are disposed on either side of strut 52. Air dam portions 82, 84a, and 84b prevent cooling airflow provided by strut 52 from being provided aftward. Instead, cooling airflow is directed forward.

In the embodiment shown in FIG. 5, an additional air dam portion 86 is located forward of strut 52, but non-adjacent to air dam portions 84a and 84b. As a result, a flowpath is provided between air dam portion 86 and air dam portions 84a and 84b as indicated by the flow arrows. In this way, the circulation of cooling airflow through the OD cavity is influenced and directed by the geometry of heat shield 76, including air dams 80 and 86, as well as flange 78 and metering holes 88.

Although a particular geometry associated with the heatshield located between frame outer ring 48 and fairing outer ring 54 has been disclosed, in other embodiments various other heatshield geometries may be utilized to achieve desired airflow patterns. The following are non-exclusive descriptions of possible embodiments of the present invention.

A turbine exhaust case (TEC) employed in an industrial gas turbine engine includes a frame, a fairing, and a heat shield. The frame has a frame outer ring, a frame inner ring, and a plurality of frame struts connected between the outer ring and the inner ring. The fairing has a fairing outer ring, a fairing inner ring, and a plurality of fairing struts connected between the fairing outer ring and the fairing inner ring. The heat shield is located between the frame outer ring and the fairing outer ring and provides a thermal barrier between the fairing outer ring and the frame outer ring. The heat shield includes an aft portion having a flange that interfaces with the frame outer ring to form an air dam that directs cooling airflow forward along the frame outer ring within an outer diameter (OD) cavity formed between the frame outer ring and the heat shield.

The TEC of the preceding paragraph can optionally include, additionally and/or alternatively, any one or more of the following features, configurations and/or additional components:

wherein the heat shield includes a plurality of metering holes that direct a desired amount of cooling airflow aft towards an aft seal;

wherein the plurality of metering holes are of equal size;

wherein the plurality of metering holes include metering holes of at least two different sizes;

wherein the plurality of metering holes are equally spaced circumferentially around the heat shield;

wherein cooling airflow is supplied to the OD cavity via a hollow strut that discharges cooling airflow into the OD cavity between the frame outer ring and the heat shield;

wherein the heat shield further includes a second air dam for directing the cooling airflow discharged by the hollow strut into the OD cavity;

wherein the second air dam includes a first air dam portion located aft of the hollow strut;

wherein the second air dam includes a second air dam portion and third air dam portion located on either side of the hollow strut and formed integral with the first air dam portion to direct the cooling airflow discharged by the hollow strut forward; and further including a third air dam located forward of the hollow strut, but not adjacent to the second and third air dam portions to provide a passageway for directing cooling airflow forward and circumferentially around the OD cavity.

A heat shield located within an outer diameter (OD) cavity created between a frame outer ring and a fairing outer ring includes a forward portion and an aft portion. The aft portion includes a flange that extends away from the aft portion, wherein the flange mates with a frame outer case to form an air dam that directs cooling airflow towards the forward portion of the heat shield.

The TEC of the preceding paragraph can optionally include, additionally and/or alternatively, any one or more of the following features, configurations and/or additional components:

wherein the heat shield includes a plurality of metering holes that direct a desired amount of cooling airflow aft towards an aft seal;

wherein the plurality of metering holes are of equal size;

wherein the plurality of metering holes include metering holes of at least two different sizes;

wherein the plurality of metering holes are equally spaced circumferentially around the heat shield;

wherein cooling airflow is supplied to the OD cavity via a hollow strut that discharges cooling airflow into the OD cavity between the frame outer ring and the heat shield;

wherein the heat shield further includes a second air dam for directing the cooling airflow discharged by the hollow strut into the OD cavity;

wherein the second air dam includes a first air dam portion located aft of the hollow strut;

wherein the second air dam includes a second air dam portion and third air dam portion located on either side of the hollow strut and formed integral with the first air dam portion to direct the cooling airflow discharged by the hollow strut forward; and further including a third air dam located forward of the hollow strut, but not adjacent to the second and third air dam portions to provide a passageway for directing cooling airflow forward and circumferentially around the OD cavity.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A turbine exhaust case (TEC) employed in an industrial gas turbine engine, the turbine exhaust case comprising:
 a frame having a frame outer ring, a frame inner ring, and a plurality of hollow frame struts connected between the outer ring and the inner ring, wherein the hollow frame struts include a plurality of fluid carrying apertures;
 a fairing having a fairing outer ring, a fairing inner ring, and a plurality of fairing struts connected between the fairing outer ring and the fairing inner ring; and
 a heat shield located between the frame outer ring and the fairing outer ring that provides a thermal barrier between the fairing outer ring and the frame outer ring, wherein the heat shield includes an aft portion having a flange that interfaces with the frame outer ring to form an air dam that directs cooling airflow forward along the frame outer ring within an outer diameter (OD) cavity formed between the frame outer ring and the heat shield;
 wherein the plurality of fluid carrying apertures are configured to carry fluid from a hollow portion of the frame strut and are located proximal an outer diameter cavity between the heat shield and the frame outer ring.

2. The turbine exhaust case of claim 1, wherein the heat shield includes a plurality of metering holes that direct a desired amount of cooling airflow aft towards an aft seal.

3. The turbine exhaust case of claim 2, wherein the plurality of metering holes are of equal size.

4. The turbine exhaust case of claim 2, wherein the plurality of metering holes include metering holes of at least two different sizes.

5. The turbine exhaust case of claim 2, wherein the plurality of metering holes are equally spaced circumferentially around the heat shield.

6. The turbine exhaust case of claim 1, wherein the heat shield further includes a second air dam for directing the cooling airflow discharged by the hollow strut into the OD cavity.

7. The turbine exhaust case of claim 6, wherein the second air dam includes a first portion located aft of the hollow strut.

8. The turbine exhaust case of claim 7, wherein the second air dam includes a second portion and third portion located on either side of the hollow strut and formed integral with the first portion to direct the cooling airflow discharged by the hollow strut forward.

9. The turbine exhaust case of claim 8, further including a third air dam located forward of the hollow strut, but not adjacent to the second and third air dam portions to provide a passageway for directing cooling airflow forward and circumferentially around the OD cavity.

10. The turbine exhaust case of claim 1, wherein the plurality of fluid carrying apertures are positioned to expel airflow circumferentially outward from the hollow frame struts.

11. A heat shield disposed in an outer diameter (OD) cavity between a frame outer ring and a fairing outer ring, the heat shield comprising:
 a forward portion;
 an aft portion having a flange that extends away from the aft portion, wherein the flange forms an air dam that directs cooling airflow towards the forward portion of the heat shield; and
 a second air dam located at least partially surrounding a strut-receiving hole for directing the cooling airflow forward, wherein the second air dam includes a first portion located aft of the strut-receiving hole.

12. The heat shield of claim 11, wherein the heat shield includes a plurality of metering holes that direct a desired amount of cooling airflow aftward of the heat shield.

13. The heat shield of claim 12, wherein the plurality of metering holes are of equal size.

14. The heat shield of claim 12, wherein the plurality of metering holes include metering holes of at least two different sizes.

15. The heat shield of claim 12, wherein the plurality of metering holes are equally spaced circumferentially around the heat shield.

16. The heat shield of claim 11, wherein the second air dam includes a second portion and a third portion located on either side of the strut-receiving hole and formed integral with the first portion to direct the cooling airflow forward.

17. The heat shield of claim 16, further including a third air dam located forward of the strut-receiving hole, but not adjacent to the second and third portions to provide a passageway for directing cooling airflow forward.

* * * * *